United States Patent
Feng et al.

(10) Patent No.: US 8,076,917 B2
(45) Date of Patent: Dec. 13, 2011

(54) BUCK SWITCHING REGULATOR WITH IMPROVED MODE TRANSITION AND CONTROL METHOD THEREOF

(75) Inventors: Chieh-Min Feng, Jhubei (TW); Kuo-Lung Tseng, Taoyuan (TW); Jian-Rong Huang, Hsinchu (TW); Wei-How Chan, Jhubei (TW)

(73) Assignee: Richtek Technology Corporation (TW)

( * ) Notice: Subject to any disclaimer, the term of this patent is extended or adjusted under 35 U.S.C. 154(b) by 428 days.

(21) Appl. No.: 12/384,496

(22) Filed: Apr. 6, 2009

(65) Prior Publication Data

US 2009/0200998 A1   Aug. 13, 2009

(30) Foreign Application Priority Data

Sep. 2, 2008 (TW) ............................... 97133625 A (51) Int. Cl.
*G05F 1/575* (2006.01)
(52) U.S. Cl. ........................................................ 323/282

(58) Field of Classification Search .................. 323/282, 323/284, 268, 283, 285–286
See application file for complete search history.

(56) References Cited

U.S. PATENT DOCUMENTS

| | | | |
|---|---|---|---|
| 7,583,138 B1 * | 9/2009 | DeStasi et al. | 330/10 |
| 2007/0046273 A1 * | 3/2007 | Riehl | 323/282 |

* cited by examiner

*Primary Examiner* — Harry Behm
(74) *Attorney, Agent, or Firm* — Tung & Associates (57) ABSTRACT

The present invention discloses a buck switching regulator with improved mode transition, and a method for controlling a buck switching regulator. The method comprises: providing a switching regulator including: an output power stage for converting an input voltage to an output voltage, the output power stage being controlled by a first PWM signal during a fixed-frequency PWM mode (FPWM mode), and being controlled by a first voltage signal during a pulse skipping mode (PSK mode), wherein the first PWM signal is generated according to the first voltage signal; and in a transition from the PSK mode to the FPWM mode, proving a second voltage signal as a starting point of the first voltage signal, the second voltage signal being substantially close to a target of the first voltage signal in the FPWM mode.

7 Claims, 7 Drawing Sheets

BUCK SWITCHING REGULATOR WITH IMPROVED MODE TRANSITION AND CONTROL METHOD THEREOF

FIELD OF INVENTION

The present invention relates to a buck switching regulator and control method thereof, and particularly to a buck switching regulator with improved mode transition and control method thereof.

DESCRIPTION OF RELATED ART

In a voltage-controlled buck switching regulator, a smooth transition from a pulse skipping mode (PSK) to a fixed-frequency PWM (FPWM) is usually difficult to achieve in the industry. The main reason is that the two modes have totally different definitions in pulse width.

Figure 1A:
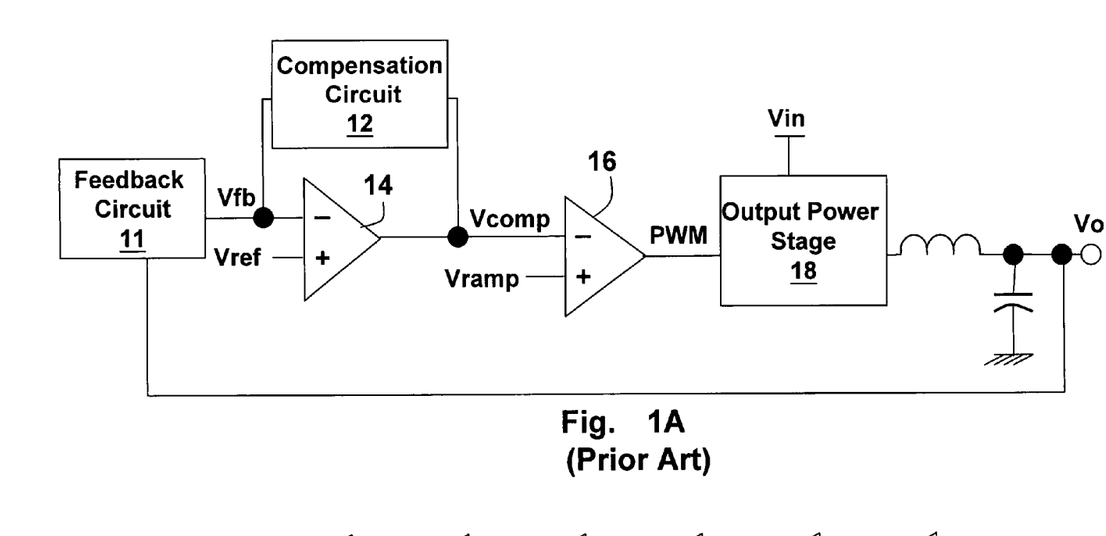
FIG. 1A shows schematically a prior art buck switching regulator operating under the FPWM mode.
Figure 1B:
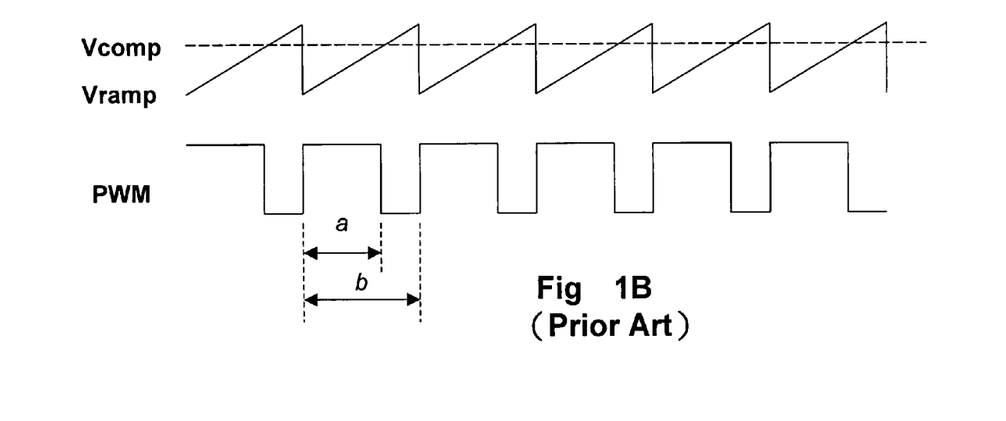
FIG. 1B shows a waveform corresponding to the circuit in FIG. 1A.

More specifically, FIGS. 1A and 1B schematically show the circuit structure and the operation of a conventional buck switching regulator under the FPWM mode, wherein FIG. 1A illustrates the circuit structure and FIG. 1B illustrates a relationship among a Vcomp signal, a Vramp signal, and a PWM signal. A feedback circuit 11 extracts a feedback signal Vfb from an output Vo and inputs it to an operational amplifier 14. The feedback signal Vfb is compared with a reference voltage Vref to generate a Vcomp signal, which is inputted to a comparator 16 to be compared with the Vramp signal. A compensation circuit 12 is typically provided in the circuit to keep the Vcomp signal stable. The PWM signal generated from the comparator 16 controls an output power stage 18, so that an input voltage Vin is converted to the output voltage Vo. Typically, the feedback circuit 11 is a voltage division circuit and the compensation circuit 12 is a parallel circuit including a resistor and a capacitor connected in parallel.

As shown in FIG. 1B, the higher the level of the Vcomp signal is, the longer the on time period a of the PWM signal will be, and the lager the duty cycle D=a/b, wherein b is a complete cycle period of the PWM signal. (The waveform of the PWM signal is reversed for better illustration. Actually in the circuit shown in FIG. 1A, the on time of the output signal from the comparator 16 is its low level.) Since the duty cycle relates to a ratio of the output voltage Vo to the input voltage Vin (Vo/Vin), the Vcomp signal should be properly determined so that the output signal Vo falls within a required specification.

Figure 2A:
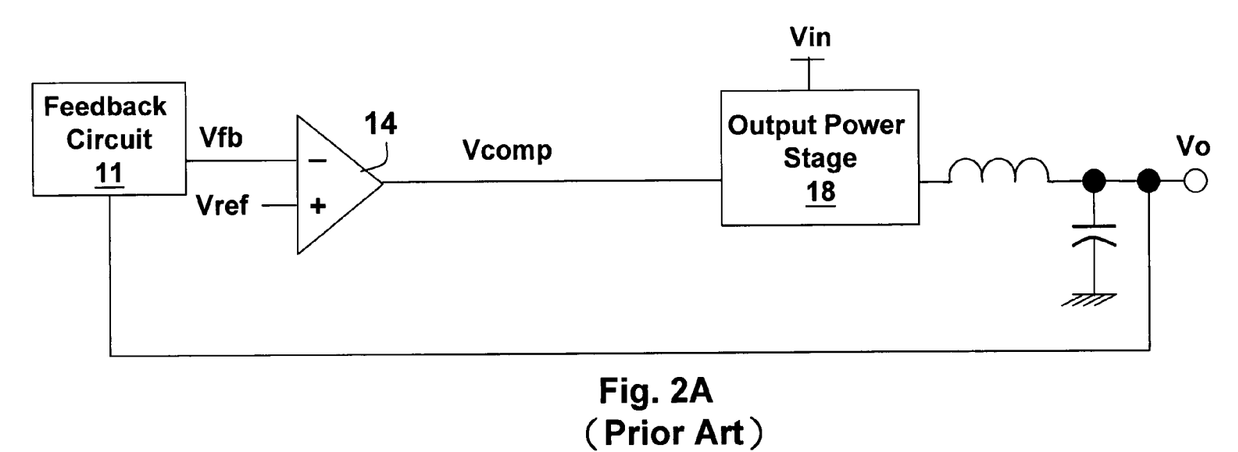
FIG. 2A shows schematically the prior art buck switching regulator operating under the PSK mode.
Figure 2B:
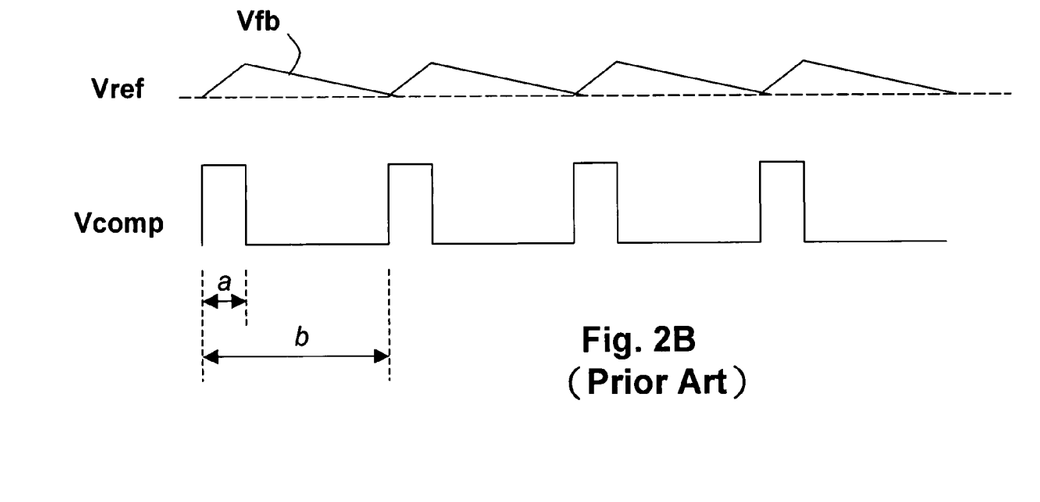
FIG. 2B shows a waveform corresponding to the circuit in FIG. 2A.

On the other hand, FIGS. 2A and 2B schematically show the circuit structure and the operation of the conventional buck switching regulator 1 under the PSK mode, wherein FIG. 2A shows the circuit structure and FIG. 2B shows the relationship among the output Vo, Vref signal, and Vcomp signal. Under this mode, the device 14 operates more like a comparator than an operational amplifier. When the Vfb signal is low, the Vcomp signal becomes high; hence, the output power stage 18 drives current to the output and causes the output voltage Vo to rise up. When the output voltage Vo rises up, the Vfb signal is higher than Vref signal; hence, the Vcomp signal falls to a low level again. The waveform of the Vcomp signal generated thereby is shown in the bottom of FIG. 2B.

Under a light load condition, the PSK mode operates more efficiently than the FPWM mode, because the period b of the PSK mode is much longer than that in the FPWM mode. In other words, the switching loss in the PSK mode is much lower than the FPWM mode.

Figure 3:
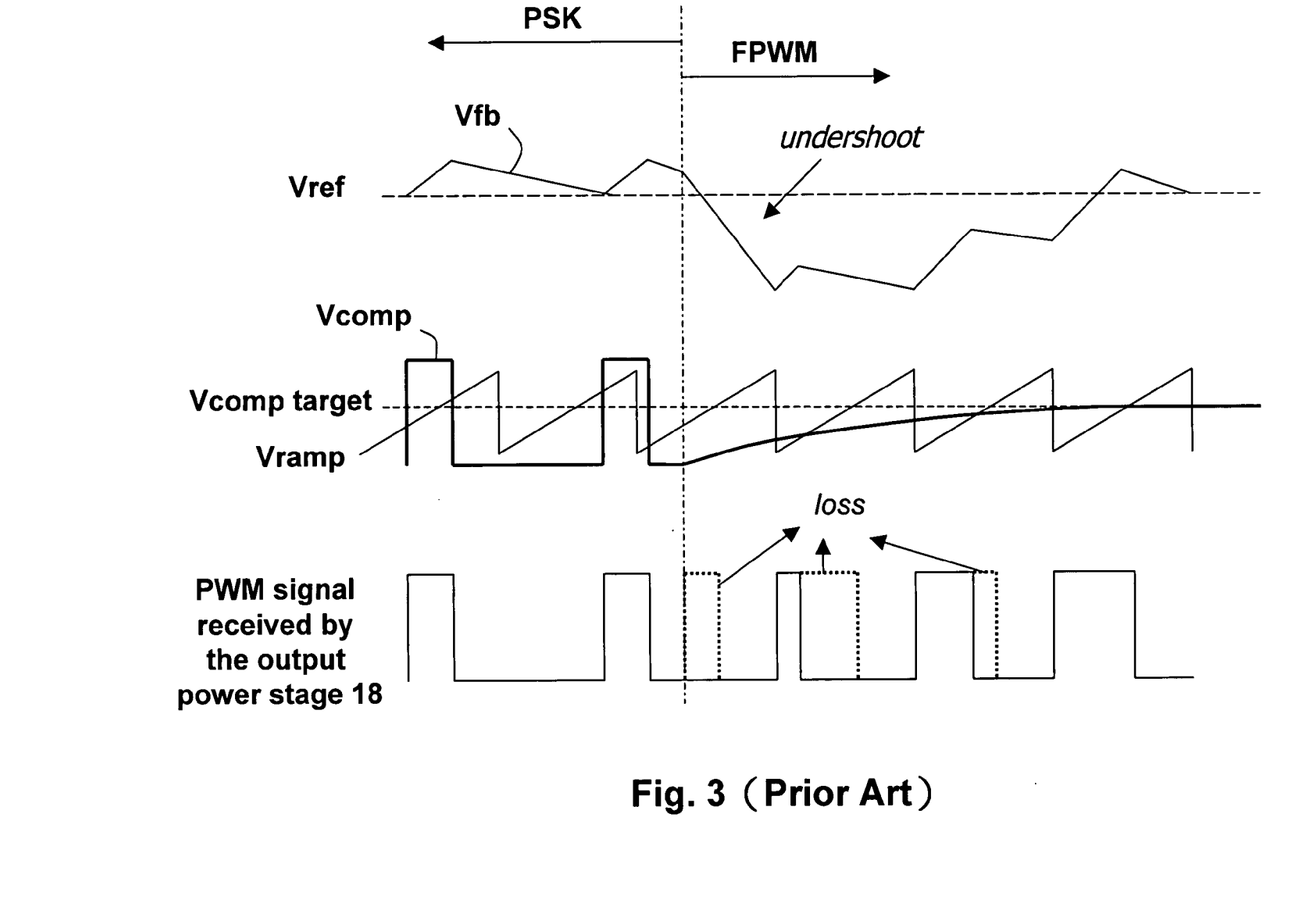
FIG. 3 illustrates a problem of the prior art when it transits from the PSK mode to the FPWM mode.

However, if these two operation modes are both provided in the same power chip, a switching issue occurs. In the FPWM mode, the Vcomp signal is a constant in most of the time, but in the PSK mode, the Vcomp signal is a digital signal oscillating between two levels. During the transition period from the PSK mode to the FPWM mode, the Vcomp signal gradually transits toward a correct target level, and this requires time which depends on the driving ability of the comparator/operational amplifier 14, the compensation ability of the compensation circuit 12, and the parasitic capacitance of the circuit. As shown in FIG. 3, however, such transition period typically lasts several switching cycles for the Vcomp signal to finally achieve the correct target level. Before the Vcomp signal achieves the correct target level, the PWM signal received by the output power stage 18 may lose several pulses or provide insufficient pulse widths, causing an undershoot of the output voltage Vo. The undershoot of the output voltage Vo may cause serious problems in a next-stage circuit.

Accordingly, the present invention provides a buck switching regulator with improved mode transition and control method thereof to overcome the shortcoming of the foregoing prior art.

SUMMARY OF THE INVENTION

A first objective of the present invention is to provide a buck switching convertor with improved mode transition.

A second objective of the present invention is to provide a method for controlling a buck switching regulator.

In order to achieve the foregoing objectives, in one perspective thereof, the present invention provides a buck switching regulator with improved mode transition comprising: (1) a first circuit including: an output power stage for converting an input voltage to an output voltage; a comparison and amplification circuit comparing a feedback signal relating to the output voltage with a reference signal to generate a first voltage signal; a first comparator comparing the first voltage signal with a ramp signal to generate a first PWM signal; wherein the first PWM signal controls the output power stage during a FPWM mode, and the first voltage signal controls the output power stage during a PSK mode; and (2) a second circuit generating a second voltage signal during the PSK mode, the second voltage signal being substantially close to the first voltage signal during the FPWM mode, and providing the second voltage signal as a starting point of the first voltage signal during the PWM mode.

In a preferable embodiment, the second circuit of the foregoing buck switching regulator includes: an average circuit which receives a second PWM signal, and converts the second PWM signal to an average voltage output; an operational amplifier which compares a feedback signal relating to the average voltage with the reference signal to generate the second voltage signal; and a second comparator which compares the second voltage signal with the ramp signal to generate the second PWM signal. The average circuit can be a simple RC circuit.

Additionally, in another perspective, the present invention also provides a method for controlling a buck switching regulator, comprising the steps of: providing a switching regulator including an output power stage for converting an input voltage to an output voltage, the output power stage being controlled by a first PWM signal during a FPWM mode and being controlled by a first voltage signal during a PSK mode, wherein the first PWM signal is generated according to the first voltage signal; and in a transition from the PSK mode to the FPWM mode, providing a second voltage signal as a starting point for the first voltage signal, the second voltage signal being substantially close to a target of the first voltage signal in the FPWM mode.

Preferably, the method for controlling a buck switching regulator further comprising: in the PSK mode, keeping the second voltage signal substantially close to the first voltage signal in the FPWM mode.

The objectives, technical details, features, and effects of the present invention will be better understood with regard to the detailed description of the embodiments below, with reference to the drawings, wherein resembled devices are indicated in the same unit.

DESCRIPTION OF THE PREFERRED EMBODIMENTS

Figure 4:
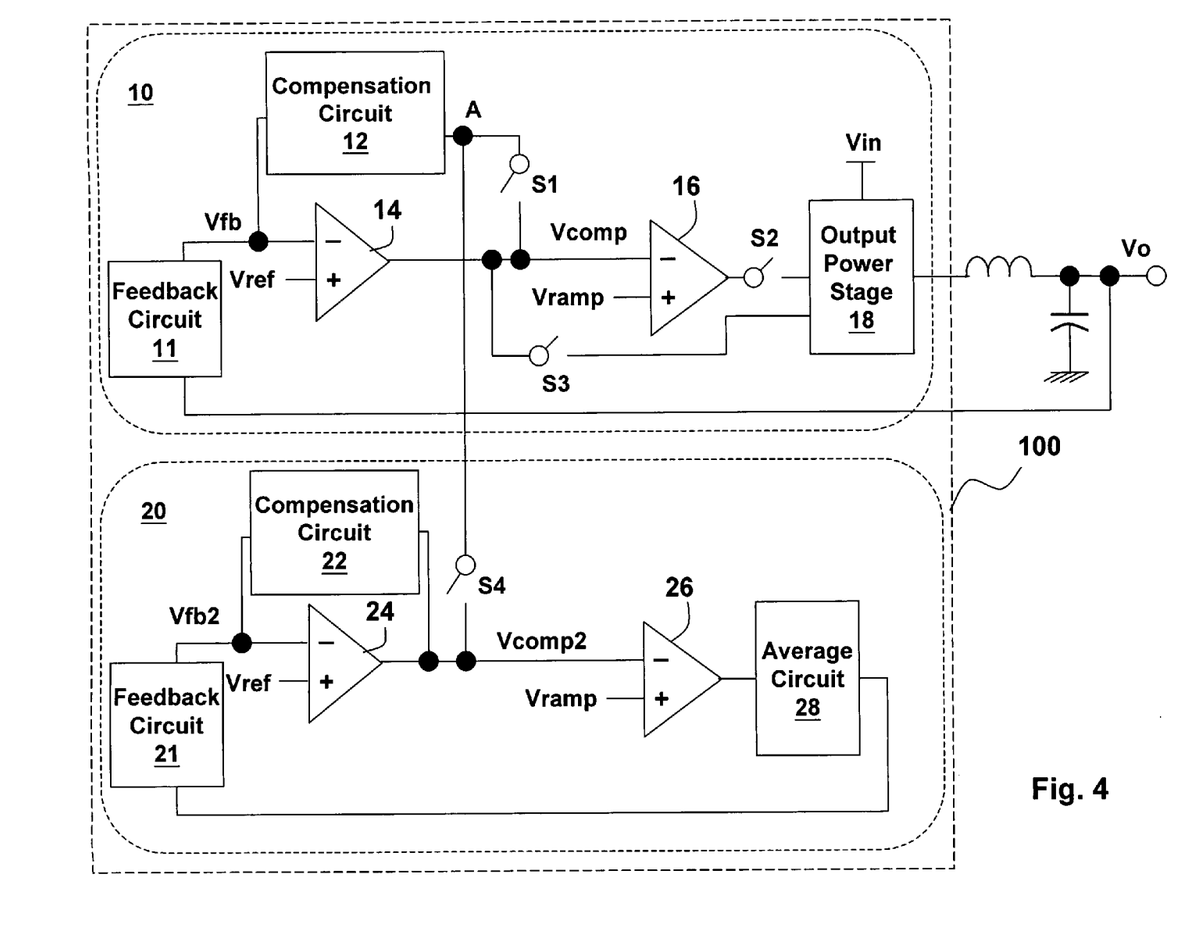
FIG. 4 shows an embodiment of the buck switching regulator of the present invention.

Please refer to FIG. 4, which schematically shows an embodiment of the present invention. Other than a primary loop 10, the buck switching regulator 100 of the present invention further comprises a secondary loop 20. The primary loop 10 comprises a feedback circuit 11, a compensation circuit 12, a comparator/operational amplifier 14, a comparator 16, and an output power stage 18. The primary loop 10 operates in a manner similar to that in the prior art; hence, detailed description thereof is omitted. The secondary loop 20 comprises a feedback circuit 21, a compensation circuit 22, an operational amplifier 24, a comparator 26, and an average circuit 28. The circuit further comprises switches S1-S4.

An objective of the secondary loop 20 is to keep the voltage at the node A in the PSK mode equal to or substantially close to the target level of the Vcomp signal in the FPWM mode. As such, since the Vcomp signal is substantially close to the target level during a transition from the PSK mode to the FPWM mode, the PWM signal neither loses a pulse nor provides an insufficient pulse width, and therefore no undershoot occurs in the output voltage Vo. However, the voltage at the node A can not be arbitrarily decided; its value is dependent on the circuit devices in the primary loop 10. Therefore, the present invention provides the secondary loop 20 having a circuit structure which is highly similar to the primary loop 10, so as to generate a Vcomp2 signal in an environment similar to the primary loop 10 such that the voltage level of the Vcomp2 signal is equal to or substantially close to the target level of the Vcomp signal in the FPWM mode. (In other words, the circuit maintains the Vcomp2 signal in the PSK mode to be substantially close to the Vcomp signal in the FPWM mode.)

Figure 5:
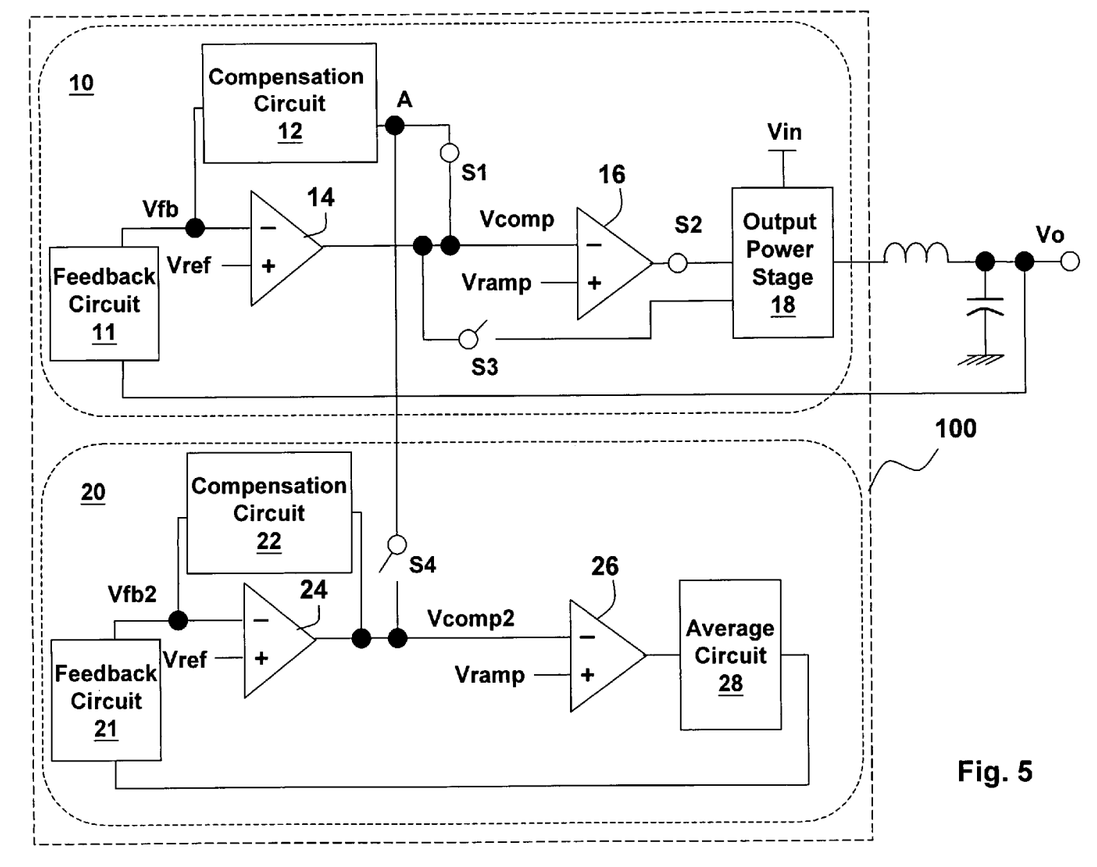
FIG. 5 shows how the embodiment of FIG. 4 operates under the FPWM mode.

More specifically, in the FPWM mode, the switches S1 and S2 are on and the switches S3 and S4 are off, as shown in FIG. 5. The primary loop 10 generates the PWM signal according to cross-over points between the Vcomp signal and the Vramp signal, and the PWM signal controls the output power stage 18 to convert the input voltage Vin to the output voltage Vo. Simultaneously, the secondary loop 20 generates the Vcomp2 signal according to its loop operation. Since the circuit devices 21, 22, 24, and 26 are similar to the circuit devices 11, 12, 14, and 16 (the circuit device 28 can also be designed the same as the circuit device 18, yet in consideration of cost, it is preferably achieved by a simple average circuit which will be illustrated later), the Vcomp2 signal is substantially close to the Vcomp signal in the FPWM mode. In other words, the Vcomp2 signal is substantially close to the target level of the Vcomp signal.

Figure 6:
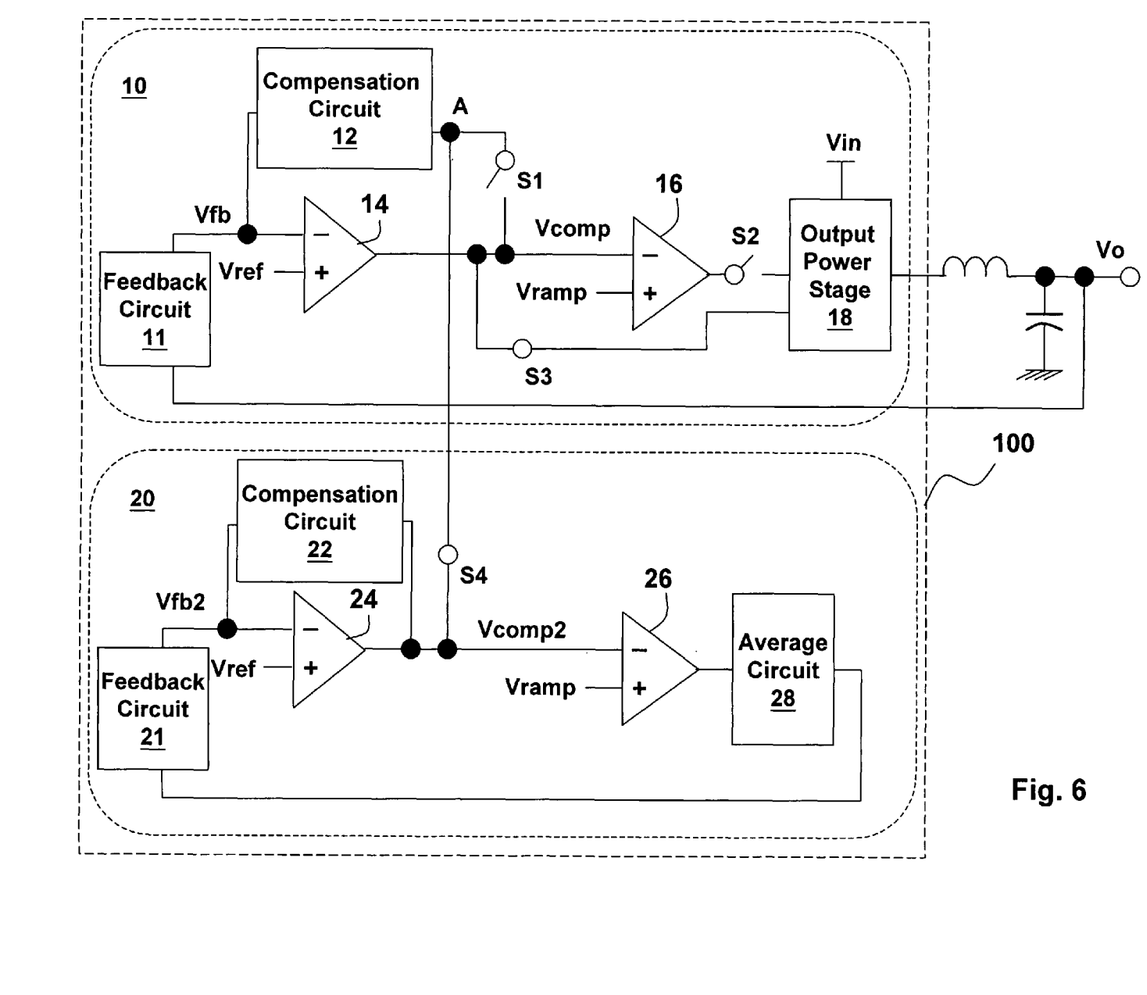
FIG. 6 shows how the embodiment of FIG. 4 operates under the PSK mode.

Next referring to FIG. 6, in the PSK mode, switches S3 and S4 are on, and switches S1 and S2 are off, during which the primary loop 10 controls the output power stage 18 according to the Vcomp signal. Yet, since the switch S4 is on, the voltage level at the node A maintains at the level of the Vcomp2 signal. When the circuit transits from the PSK mode to the FPWM mode, the switch S1 is turned on again and electrically connects the node A to an input of the comparator 16. At this time point, however, the Vcomp signal starts from the voltage level of the Vcomp2 signal instead of the low level (referring to FIG. 3). Moreover, the Vcomp2 signal is very close to the target level of the Vcomp signal in the FPWM mode. As a result, the Vcomp signal can quickly reach the target level to avoid any undershoot of the output voltage Vo.

Figure 7:
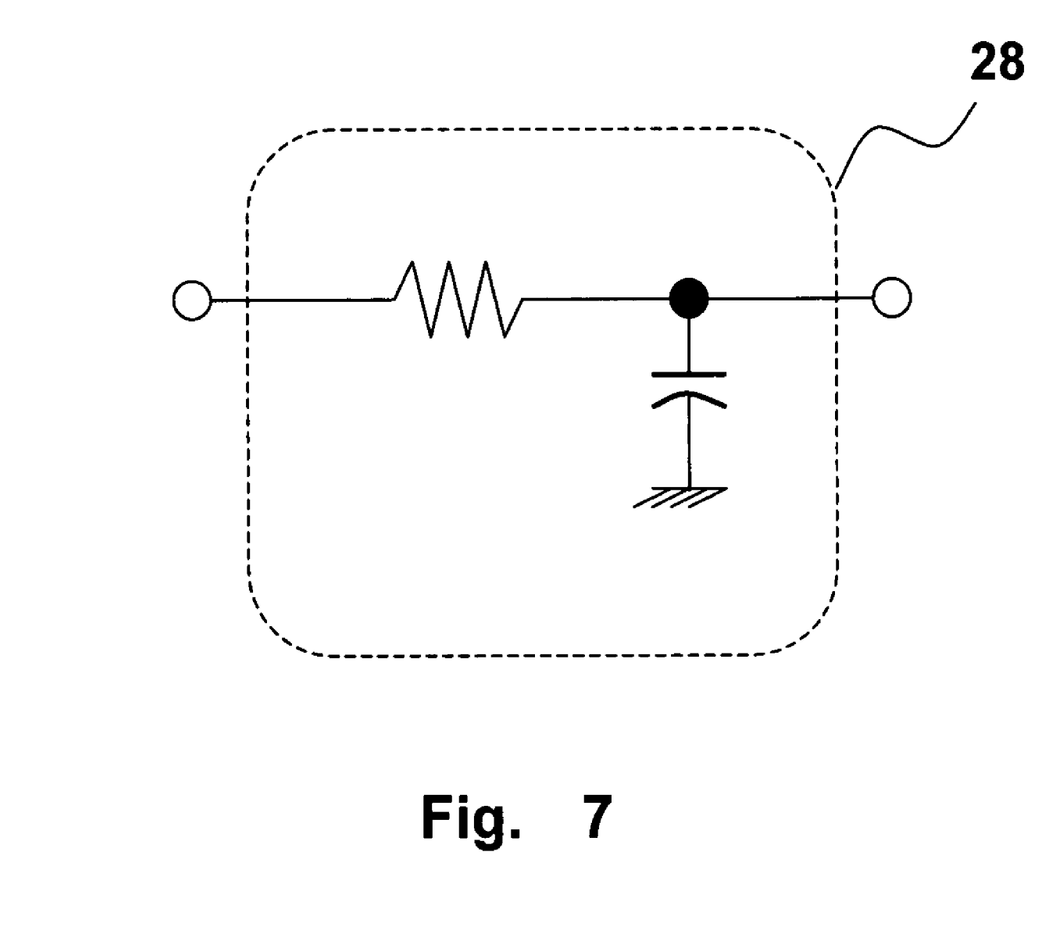
FIG. 7 shows an embodiment of the average circuit.

As mentioned earlier, in order to make the Vcopm2 signal substantially close to the Vcomp signal in the FPWM mode, the overall structure of the secondary loop 20 should preferably be highly similar to the primary loop 10. Hence, the circuit devices 21, 22, 24 and 26 are preferably highly similar to the circuit devices 11, 12, 14, 16, and the circuit device 28 can be designed to be the same as the circuit device 18 as well. However, the output power stage 18 is a more complicated and expensive circuit; hence, the circuit device 28 does not have to be, and is preferably not to be the same as the circuit device 18. Referring to FIG. 7, the circuit device 28 can be a simple average circuit, such as the RC circuit as shown. This average circuit obtains an average voltage value of the PWM signal from the comparator 26. Similarly, a feedback voltage Vfb2 can be generated by the feedback circuit 21, and the feedback voltage Vfb2 is substantially close to the feedback voltage Vfb.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, without departing from the spirit of the present invention, the feedback circuit and the compensation circuit can be replaced by various forms or even omitted; other circuit devices which do not affect the primary function of the present invention can be interposed between two circuit devices in the embodiments as shown. In view of the foregoing, the spirit of the present invention should cover all such and other modifications and variations, which should be interpreted to fall within the scope of the following claims and their equivalents.

What is claimed is:

1. A buck switching regulator with improved mode transition comprising:
   (1) a first circuit including:
      an output power stage for converting an input voltage to an output voltage;
      a comparison and amplification circuit comparing a feedback signal relating to the output voltage with a reference signal to generate a first voltage signal;
      a first comparator comparing the first voltage signal with a ramp signal to generate a first pulse-width modulation (PWM) signal;
      wherein the first PWM signal controls the output power stage during a fixed-frequency PWM mode (FPWM mode), and the first voltage signal controls the output power stage during a pulse skipping mode (PSK mode); and
   (2) a second circuit generating a second voltage signal during the PSK mode, the second voltage signal being substantially close to the first voltage signal during the FPWM mode, and providing the second voltage signal as a starting point of the first voltage signal during the PWM mode.

2. The buck switching regulator of claim 1, wherein the second circuit includes:
   an average circuit which receives a second PWM signal, and converts the second PWM signal to an average voltage output;
   an operational amplifier which compares a feedback signal relating to the average voltage with the reference signal to generate the second voltage signal; and
   a second comparator which compares the second voltage signal with the ramp signal to generate the second PWM signal.

3. The buck switching regulator of claim 2, wherein the average circuit is an RC circuit.

4. The buck switching regulator of claim 2, wherein the second circuit further includes: a feedback circuit electrically connected between an input of the operational amplifier and an input of the average circuit; and a compensation circuit electrically connected between the input and an output of the operational amplifier.

5. The buck switching regulator of claim 1, wherein the first circuit further includes: a feedback circuit electrically connected between an input of the comparison and amplification circuit and an output of the output power stage; and a first compensation circuit electrically connected between the input and an output of the comparison and amplification circuit.

6. A method for controlling a buck switching regulator, comprising the steps of:
   providing a switching regulator including an output power stage for converting an input voltage to an output voltage, the output power stage being controlled by a first PWM signal during a FPWM mode and being controlled by a first voltage signal during a PSK mode, wherein the first PWM signal is generated according to the first voltage signal; and
   in a transition from the PSK mode to the FPWM mode, providing a second voltage signal as a starting point for the first voltage signal, the second voltage signal being substantially close to a target of the first voltage signal in the FPWM mode, wherein the step for providing the second voltage signal includes:
      receiving a second PWM signal and converting the second PWM signal to an average voltage output;
      comparing the feedback signal relating to the average voltage with a reference signal to generate the second voltage signal; and
      comparing the second voltage signal with a ramp signal to generate the second PWM signal.

7. The method of claim 6 further including: in the PSK mode, keeping the second voltage signal substantially close to the first voltage signal in the FPWM mode.

* * * * *